(12) United States Patent
Tothill et al.

(10) Patent No.: US 12,160,521 B2
(45) Date of Patent: Dec. 3, 2024

(54) TRUNK-AND-BRANCH BLOCKCHAIN LEDGER ARCHITECTURE FOR VALIDATION OF CLAIMS

(71) Applicant: eHire, LLC, Atlanta, GA (US)

(72) Inventors: Kyle McLamb Tothill, Atlanta, GA (US); John David Brothers, Roswell, GA (US)

(73) Assignee: eHire, LLC, Atlanta, GA (US)

( * ) Notice: Subject to any disclaimer, the term of this patent is extended or adjusted under 35 U.S.C. 154(b) by 277 days.

(21) Appl. No.: 17/654,944

(22) Filed: Mar. 15, 2022

(65) Prior Publication Data
US 2023/0299969 A1    Sep. 21, 2023

(51) Int. Cl.
*H04L 9/32* (2006.01)
*H04L 9/08* (2006.01)
*H04L 9/00* (2022.01)

(52) U.S. Cl.
CPC .......... *H04L 9/3247* (2013.01); *H04L 9/0825* (2013.01); *H04L 9/3236* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | | |
|---|---|---|---|---|
| 11,804,966 | B2* | 10/2023 | Murdoch | H04L 63/126 |
| 2020/0127844 | A1* | 4/2020 | van der Laak | H04L 9/0637 |
| 2022/0385475 | A1* | 12/2022 | Murdoch | H04L 63/12 |
| 2022/0393858 | A1* | 12/2022 | Barger | H04L 9/50 |
| 2022/0398567 | A1* | 12/2022 | Novotny | H04L 9/30 |
| 2023/0004970 | A1* | 1/2023 | Jakobsson | G06Q 20/407 |

OTHER PUBLICATIONS

Mehmet Aydar et al: "Towards a Blockchain based digital identity verification record attestation and record sharing system Jun. 24, 2019, Arxiv.Org, Cornell University Library, 201 Olin Library Cornell University Ithaca, NY, pp. 1-25". (Year: 2019).*

(Continued)

*Primary Examiner* — Joseph P Hirl
*Assistant Examiner* — Hassan Saadoun
(74) *Attorney, Agent, or Firm* — Eversheds Sutherland (US) LLP

(57) ABSTRACT

Systems, devices, and methods are provided for trunk and branch blockchain ledger architecture for validation of real-world claims. Claims may relate to objective claims, such as an individual's work history or whether an organization has insurance coverage. Trunks and branches may be used to implement a network of cross-ledger claims and endorsements. A first entity (e.g., endorser) may make a claim on a first branch blockchain ledger that is controlled by the first entity. A second entity (e.g., endorser) may review the claim, determine whether it is true, and then produce an endorsement on a second blockchain ledger that is controlled by the second entity. The endorsement may be an encoded version of the claim that cannot be used to reverse-engineer the claim. An endorsement pointer may be recorded to the first branch blockchain ledger that references the endorsement recorded by the second entity to the second blockchain ledger.

17 Claims, 11 Drawing Sheets

(56) References Cited

OTHER PUBLICATIONS

Zhong Tao et al: "Joint Cloud Cross-chain verification Model of Decentralized identifiers, Oct. 19, 2021, 2021 IEEE International Performance, Computing and Communications Conference (IPCCC), IEEE, pp. 1-8" (Year: 2021).*

International Search Report and the Written Opinion of the International Application No. PCT/US2023/014900 dated Jun. 19, 2023 (4 pages).

Mehmet, Aydar et al., "Towards a Blockchain Based Digital Identity Verification, Record Attestation and Record Sharing System," Arxiv. Org, Cornell University Library, 201 Olin Library Cornell Univeristy Ithaca, NY, Jun. 24, 2019 (25 Pages).

Zhong, Tao et al., "JointCloud Cross-Chain Verification Model of Decentralized Identifiers," 2021 IEEE International Performance, Computing and Communications Conference (IPCCC), Oct. 29, 2021 (8 pages).

* cited by examiner

Claim Request 506

```
{
  name: "Joe Somebody",
  employer: "XYZ Corp",
  start: "01-01-2005",
  end: "01-01-2007",
  title: "Sr. Engineer",
}
```

Endorsement Response 508

```
{
  name: "Joe Somebody",
  employer: "XYZ Corp",
  start: "01-01-2005",
  end: "01-01-2007",
  title: "Sr. Engineer",
  verification_company: "Verify Co.",
  verified_by_person: "Naomi"
}
HASH: 0020c0336e43d498dbbf5c25758ed751f67b19ec
```

Claimant 502

Endorser 504

FIG. 5

TRUNK-AND-BRANCH BLOCKCHAIN LEDGER ARCHITECTURE FOR VALIDATION OF CLAIMS

BACKGROUND

There are many challenges involved in verification and authentication of information. For example, in many job applications, an applicant makes several claims as to their education, prior work experience, immigration status, and so forth. In many cases, determining the veracity of such information is a time consuming process and may involve costly delays. Furthermore, in many cases, such information is not readily shared or re-usable, resulting in duplicative or wasteful efforts.

Accordingly, there is a need for improving how claims made by an individual or organization are made and verified.

BRIEF DESCRIPTION OF THE DRAWINGS

FIG. 5 illustrates a claim by a first party and endorsement of such claim by a second party, in accordance with one or more example embodiments of the present disclosure.

Figure 1:
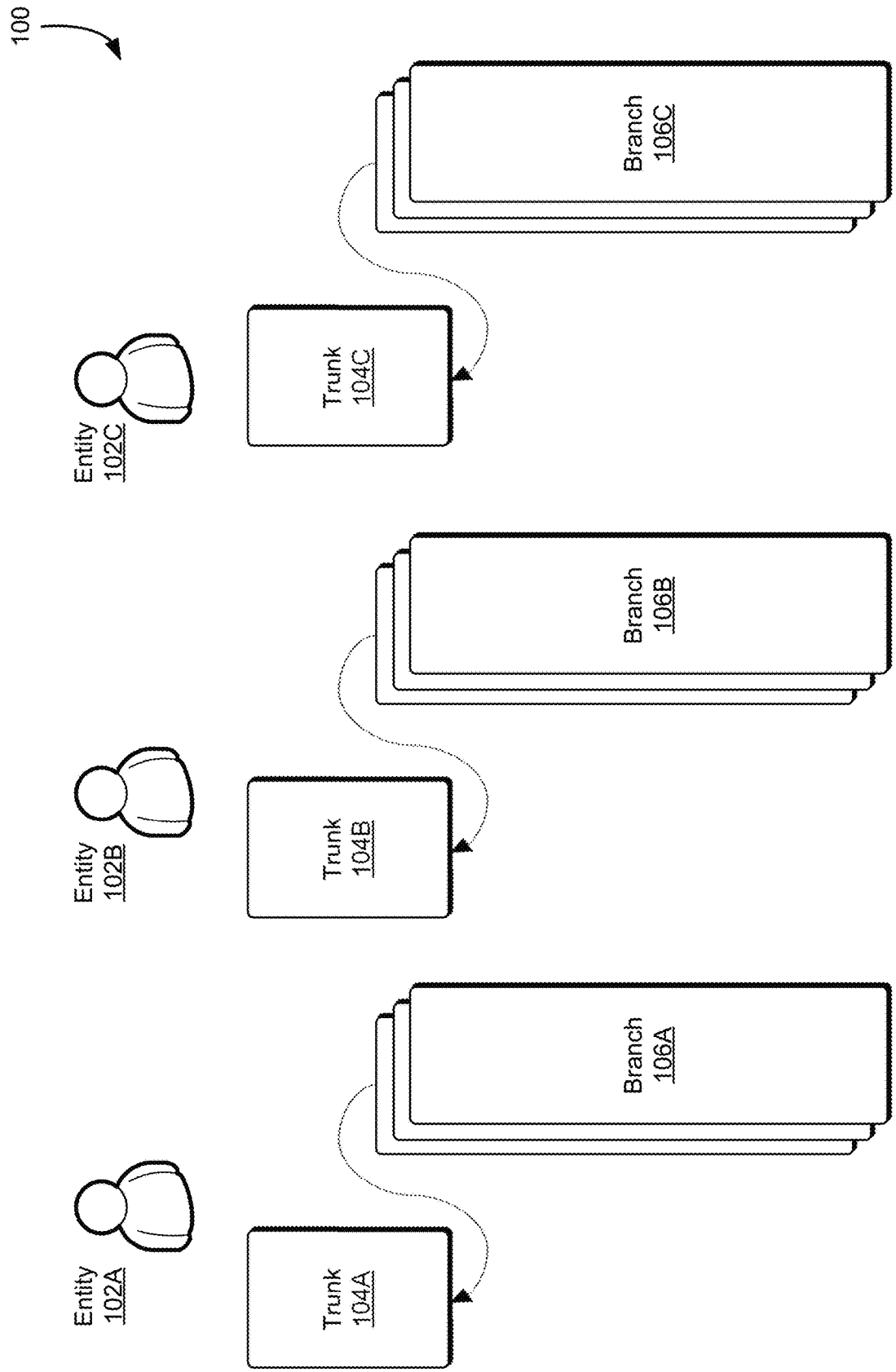
FIG. 1 illustrates a trunk-and-branch model for utilizing blockchain technologies, in accordance with one or more example embodiments of the present disclosure. A trunk-and-branch architecture may be used to implement endorsed resumes and other applications involving verifiable claims.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Techniques described herein may be utilized to endorse claims on an electronic document and augment or otherwise provide verification of the veracity of work histories, certifications, and other statements that may be made by an entity.

FIG. 1 illustrates a computing environment 100 of a trunk-and-branch model for utilizing blockchain ledgers, in accordance with one or more example embodiments of the present disclosure. A trunk-and-branch architecture may be used to implement endorsed resumes and other applications involving verifiable claims.

FIG. 1 illustrates entities 102A, 102B, 102C, and so forth. Each entity may correspond to an individual, an organization, an agent of an organization, and so forth. An entity 102A may, for example, refer to an individual that accesses a computer system (e.g., a computer system under control of such individual) that manages the creation of a trunk 104A and corresponding branches 106A. A trunk 104A, in various embodiments, refers to a blockchain-based technology that the individual is able to use to manage information related to entity 102A. Entity 102A, in various embodiments, has the ability to generate one or more branches 104A that are implemented as discrete blockchain ledgers and entity 102A is able to control what information is included in each respective branch, including providing different information in different branches. Trunk 104A may be used by entity 102A to store public key information, identity records, and other core information that is common to a set of branches. This may, for example, include attestations of the user's identity or other information that can be used to authenticate that entity 102A is who he/she claims to be.

Trunks and branches are designed around a concept of creating relationships between claims and endorsements. A claim refers to an assertion of a statement whose veracity can be confirmed. It should be noted that unless otherwise stated, claimed described herein typically relate to claims of facts or information relating to information about the real-world, or off-chain information, as opposed to claims of on-chain information such as on-chain information that is used to confirm blockchain transactions to a ledger. Trunks, in various embodiments include public key information and other core information that is common to a set of branches. A public key may be record to trunk 104A wherein the corresponding private key is retained by entity 102A. This information may be unknown to other entities, and may be used to ensure that only entity 102A—by virtue of having access to the private key—is able to add records to trunk 104A and any branches off of trunk 104A such as branch 106A depicted in FIG. 1

Branches, in various embodiments, are the workhorse of the system. Branches, such as branch 106A, 106B, and 106C may be used to store application-related information as records in the branches. Branches may include various types of information. In particular, a branch may include one or more claims facts or events relating to the real-world (e.g., off-chain) and endorsements may refer to a mechanism by which a party can attest to the veracity or truthfulness of a claim. Claims and endorsements may be recorded to branches depicted in FIG. 1, and may be in accordance with those described elsewhere in this disclosure, such as those discussed in connection with FIGS. 2-11.

The trunk-and-branch model can be used to expedite an improve verification processes in a decentralized manner. For example, the trunk-and-branch model depicted in FIG. 1 can be used to speed up a background check process. A trunk 104A may be associated with an individual and a branch 106A may be associated with a background check process. The person's work experience can be recorded to a branch blockchain ledger and forwarded to a trusted second or third party to verify that statements made about the individual's education or work experience are true, and the attestation that the statements have been validated can also be published to the branch blockchain ledger. In contrast to conventional background checks, the information stored on the blockchain ledger is controlled by the individual making the claims and can be used in whatever manner the individual chooses (e.g., a claim endorsed for one job application can be used by the user for another job application). Furthermore, the blockchain is immutable and cannot, practically speaking be modified, deleted, or otherwise altered.

Branches can be used for different types of documents or be used to covered different types of information that individuals may want to make claims about. In contrast, trunks can be used to store information that does not need to be re-created for branches repeatedly, such as identity information about the user, or key information that is used to ensure that the owner of the branch is the only entity that is able to add new records to their respective trunks and branches.

Figure 2:
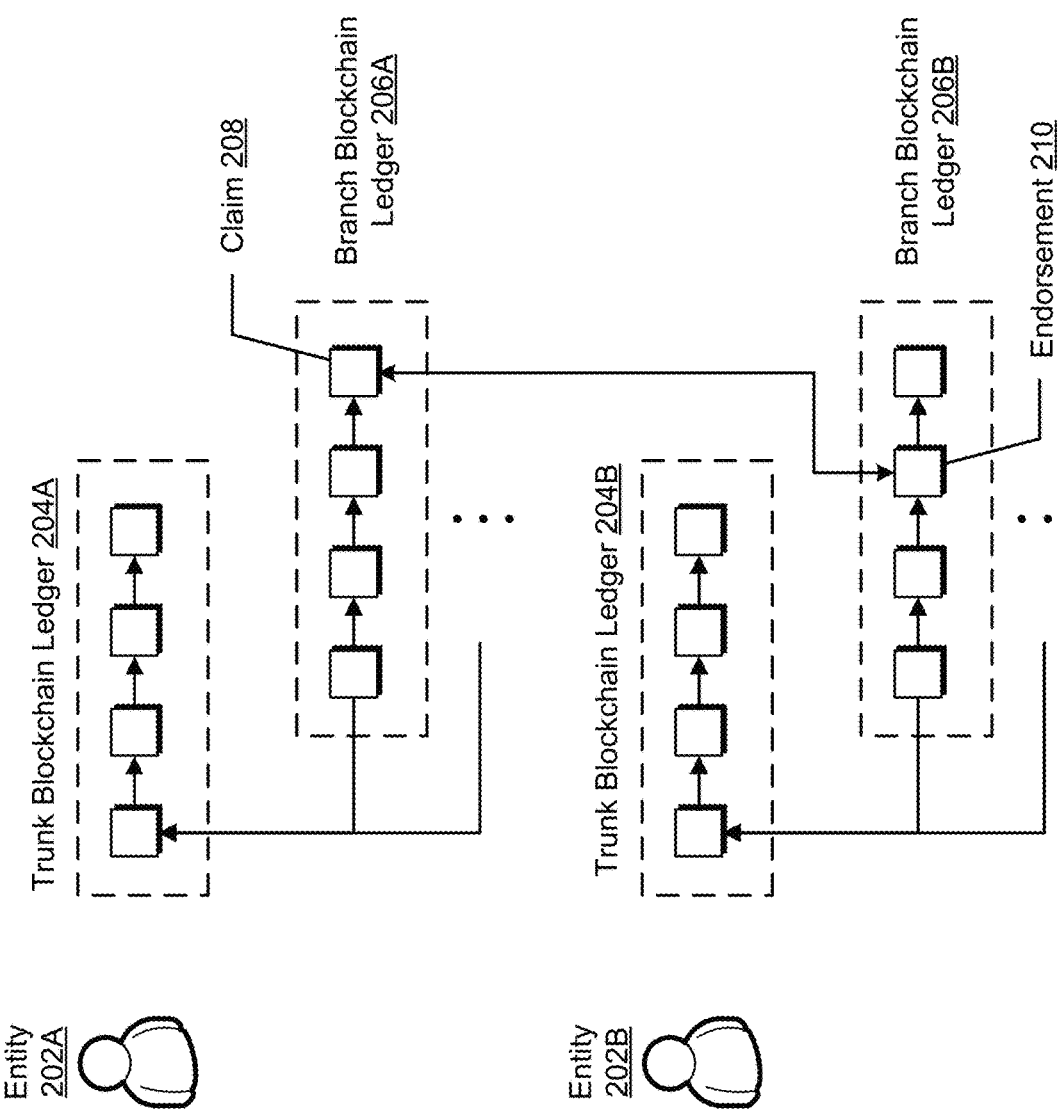
FIG. 2 illustrates an interconnected set of trunks and branches implemented as discrete blockchain ledgers, in accordance with one or more example embodiments of the present disclosure.

FIG. 2 illustrates a computing environment 200 depicting an interconnected set of trunks and branches implemented as discrete blockchain ledgers, in accordance with one or more example embodiments of the present disclosure.

FIG. 2 depicts a first entity 202A that is associated with a first trunk blockchain ledger 204A and first branch blockchain ledger 206A. Furthermore, second entity 202B is associated with a second trunk blockchain ledger 204B and a second branch blockchain ledger 206B. First branch blockchain ledger 206A may store a record of a claim 208 and second branch blockchain ledger 206B may store a record of an endorsement 210 of such claim.

Trunks and branches are used to create relationships between claims and endorsements, in various embodiments. Trunks may include public key information and other core information that is common to a set of branches. Branches may be used to store application-related information. Individuals typically put claims and endorsement points in their branches, and organizations typically put endorsements in their branches. For example, entity 202A may be an individual may make a claim 208 that he worked at ABC Corp. from 2010-2012 and entity 202B may be ABC Corp. and endorsement 210 is a cryptographically verifiable attestation that the individual did indeed work at ABC Corp. from 2010-2012.

In the context of FIG. 2, entity 202A may be considered a claimant (e.g., as noted by claim 208). A claimant may refer to an entity that relies on a blockchain-based platform to provide verifiable information regarding the claimant. Furthermore, in the context of FIG. 2, entity 202B may be considered an endorser that validate claims of the claimant (e.g., via agents of companies), and add the endorsement 210 to the company's branch blockchain ledger 206B.

While entity 202A and entity 202B are referred to as claimant and endorser, these roles are relative and may be relative to specific pieces of information. For example, where entity 202B is an organization that typically endorses the work histories of its present and past employees, the organization may also be a claimant in other contexts, such as where it uses another branch (e.g., a branch off of trunk blockchain ledger 204B other than branch blockchain ledger 206B) to submit proofs that it has insurance, complies with certain certifications (e.g., is a Mansfield Rule 3.0 Certified Firm), and so forth. Accordingly, the terms "claimant" and "endorser" should be understood in the context of a specific claim.

A claim 210, in various embodiments, refers to a verifiable statement that typically relates to a real-world or off-chain fact or event. For example, a claim may be that an individual attended a certain college, earned a certain degree, completed a certificate program, worked at a certain company over a certain time period, that the Atlanta Braves won the 2021 World Series, and so forth. In various embodiments, a claim is characterized in that its veracity is immutable—that is, that the truthfulness of a claim does not change over time. This constraint may be used to ensure that once an endorser has verified a claim, that it should not change. For example, a claim that the Atlanta Braves won the 2021 World Series can be verifiable at any point in time, and will hold true into the future. In contrast, a statement that an individual's favorite movie is Titanic is typically not considered immutable, as the individual's tastes may change over time. In some cases, the viewer of an endorsement performs additional verification. For example, a claim that an individual has an insurance policy for a specified duration of time (e.g., into the future) may be endorsed by the insurance company. The insurance company's endorsement may be an indication that the policy is valid at the time of endorsement, but that it is not necessarily true at a later point in time in the future. In such scenarios, a viewer may perform additional verification with the insurance company to determine whether the policy is still valid or not. As a specific example, a policy holder may create a claim in his/her branch that he/she holds an insurance policy for a vehicle that is valid from Sep. 21, 2022 to Mar. 21, 2022. The claim may be endorsed by the insurance company, for example, on Jan. 1, 2022. Continuing with this example, at a later point in time, perhaps Feb. 1, 2022, a viewer may use this claim to verify whether the user has a valid insurance policy by reviewing the claim, verifying the endorsement is genuine, and then checking a blockchain managed by the insurance company to verify that the policy has not been canceled or modified.

Endorsement 210 refer to a verification of a claim. According to various embodiments, an endorsement can be implemented a cryptographic hash of data in the claim. A hash function refers to a type of one-way function in which it is impractical to ascertain the output of the one-way function from the input of the one-way function that is used to produce the output. This may be used to protect the privacy of claim information. For example, endorsement 210 may be a hash that is generated (e.g., in part on) the claim 208. Branch blockchain ledger 206B may be a branch that is used primarily to broadcast endorsements and may be accessible to many parties that are using entity 202B to provide endorsements. However, other entities (e.g., a third entity unrelated to entity 202A and 202B) is not able to determine the claim 208 that was used to generate endorsement 210 due to the one-way nature of hash functions.

An endorsement pointer may refer to a data structure that a claimant adds to their branch after the claim is endorsed, pointing to the URL/URI where the endorsement branch and record can be found. In at least one embodiment, a claimant makes a verifiable statement and publishes it to the claimant's branch, an endorser verifies the claim, and publishes an endorsement on a second blockchain, and a pointer record referencing the endorsement is linked to the claim via the endorsement pointer.

A claim statement may be encoded in a human-readable format. For example, a statement may be encoded in a JSON format and in plaintext:

```
{
    companyName: "SampleCo LLC"
    startDate: "2012-05"
    endDate: "2017-05"
    title: "IT Project Manager"
    _identity: {
        name: "Joe Joeson"
        partial_id: 2554
    }
}
```

An endorsement may be a generated based on an endorsement and a cryptographic secret of the endorser. For example, a keyed hash function such as SHA512 may be used to generate a hash of the statement:

```
ACF6E0A2D973B626203802576A6649AF27D3C3A033127DA44E44468611F
54FBA2317729C91BC2527DFF4F4723466ACCB043F49C80F3BA85B0A543E
C22FDE4AAF
```

Because the Endorsement is a hash determined based on the original statement, the Endorsement information can be placed out publicly on the Internet, and no one will be able to tell what it means. On the other hand, the claimant has control over whether and how the plaintext claim statement is published (e.g., to one, all, or none of his branches) such that the claim statement is only know to parties that are provided access to a branch that includes the claim statement.

In various embodiments, each blockchain ledger is associated with a unique identifier, such as a universally unique identifier (UUID) or globally unique identifier (GUID). In some embodiments, a branch's UUID is used to construct a network address in the form of a uniform resource identifier (URI), Uniform Resource Locator (URL), or other suitable addressing system. In various embodiments, a URI, URL, or other suitable address name can be provided to share access to a blockchain ledger. Note, however, that access to a URI/URL allows a party to read the contents of the branch or trunk but not modify it, as a private key is, in various embodiments, required to publish to a ledger. For example, entity 202A may have access to a secret key that is used to broadcast claims and other records to branch blockchain ledger 206A. Access to read the contents of branch blockchain ledger 206A can be provided to entity 202B via a URI/URL, but entity 202B would still not be able to create new records on branch blockchain ledger 206A as entity 202B does not have access to the secret key. The use and implementation of such keys and security around the trunk and branch blockchain ledgers is described in greater detail elsewhere, for example, in connection with FIGS. 3-4.

Different types of statements can be generated, published, and validated, according to various embodiments. An objective claim may refer to a type of statement that is easily and constituently verifiably true. These may include, for example, historical information that cannot be retroactively modified (e.g., the Atlanta Braves won the 2021 World Series) rather than retrospective statements whose truthfulness may change over time. For example, a type of statement that would not be considered an objective claim is a subjective statement (e.g., the Atlanta Braves are the most exciting baseball team to watch) and statements that are mutable in the sense that it can change over time, and such a statement may be true at one point in time but not the future (e.g., the Seattle Mariners have never won the World Series—the truthfulness of this statement may change in the future). An example objective statement is described in relation to the example of Joe Person and the fact that he previously worked at ABC Corp. from 2012-2017. Objective claims are characterized as statements that can be confirmed from multiple sources and from which consensus can easily be reached—for example, through tax records, social security records, human resources records, and so forth. In these cases, the veracity of the claim can usually be verified by a single source or a small number of sources that endorse the claim.

In at least some embodiment, a "blockchain" or "blockchain network" refers to any and all suitable forms of distributed ledgers, which includes consensus-based blockchain and transaction-chain technologies, permissioned and un-permissioned ledgers, shared ledgers, and more. Non-limiting examples of blockchain technology include Bitcoin and Ethereum, although other examples of blockchain technologies are also contemplated in the scope of this disclosure. While Bitcoin and Ethereum may be described in connection with various embodiments of this disclosure, those embodiments are to be construed merely as illustrative examples and not limiting. For example, alternative blockchain implementations and protocols are contemplated within the scope of the present disclosure.

A blockchain network may refer to a peer-to-peer electronic ledger implemented as a decentralized system. A ledger may comprise multiple blocks wherein a genesis block is a first block of the ledger and all other blocks reference a previous block. In at least some embodiment, each block (except the genesis block) includes a hash of the previous block to which that block became chained together to create an immutable record of the block to the blockchain ledger which cannot be modified, deleted, or otherwise altered. A block may include one or more blockchain transactions. A blockchain transaction may refer to a data structure that encodes the transfer of control of a digital asset between users of the blockchain network. For example, a blockchain transaction may transfer control of a digital asset from a source address to a destination address. The blockchain transaction may be signed with a private key associated with the address which can be cryptographically verified using a corresponding public key that is made available to other parties of the blockchain network. In at least one embodiment a blockchain transaction includes a transaction input and a transaction output.

In some embodiment, a blockchain transaction is validated before it is committed to the blockchain ledger as part of a block. Blockchain nodes may be used to verify blockchain transactions, which may include verifying digital signatures of transactions, verifying that a purported owner of a digital asset is actually the owner by inspecting the blockchain ledger to verify that control of the digital asset was transferred to the purported owner and that the purported owner has not elsewhere transferred control of the digital asset (meaning that the purported owner was previous the owner of the digital asset but has previously transferred control to another entity).

Validity in the blockchain context may be consensus based, and a transaction may be considered valid if a majority of nodes agrees that the blockchain transaction is valid. In at least some embodiments, a blockchain transaction references an unspent transaction output (UTXO) that is used to validate the transaction by executing the UTXO locking and unlocking script. If the UTXO locking and unlocking script executes successfully (e.g., by evaluating to TRUE and any other validation operations). Accordingly, a blockchain transaction is written to a blockchain ledger when it is validated by a node that receives the transaction and is added to a new block by a node (e.g., miner) and actually mined by being added to the public ledger of past transactions. In at least some embodiment, a blockchain transaction is considered to be confirmed when a certain number of subsequent blocks are added to the blockchain ledger, whereinafter the blockchain transaction becomes virtually irreversible.

A blockchain transaction output may include a locking script that "locks" a digital asset by specifying a condition that is to be met in order for the encumbrance to be lifted or unlocked (e.g., to allow control of the digital asset to be transferred to another user). A locking script may be referred to as an encumbrance. An unlocking script may be a corresponding script that in combination with the locking script, removes an encumbrance on digital assets. A locking script and unlocking script may be combined to form executable code that, if executed to completion or to yield a specific result, indicates that the unlocking script is valid and that the encumberance may be removed. For example, "scriptPubKey" is a locking script in Bitcoin and "scriptSig" is an unlocking script.

It should be noted that while blockchain technology is perhaps most widely known for its use cryptocurrency, there are many other applications for blockchain technologies for providing secure systems. A secure system may refer to a system in which functionality—such as the exchange of digital assets between two or more entities—is cryptographically verifiable. A secure system may be robust to failure. A secure system may be immutable such that information that is committed to the blockchain ledger cannot be unilaterally modified by an individual. A secure system may provide additional assurances, such as assurances of confidentiality, integrity, authenticity, and nonrepudiation. Confidentiality may refer to assurances that certain information is not made publicly available (e.g., the underlying identity of a blockchain address may be kept secret or unknown). Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted. Nonrepudiation may refer to assurances that a party that digitally signs a blockchain transaction cannot deny the authenticity of the transaction.

Mining may refer to the process of validating blockchain transactions along a blockchain network. Validating blockchain transactions may involve a process of securing and verifying blockchain transactions (e.g., organized as blocks) along a blockchain. Mining may be a process that helps maintain network security by ensuring that valid blocks are recorded on a blockchain ledger. Generally speaking, participants in a mining process can be rewarded for using computing resources (e.g., compute resources such as CPUs) to solve computational algorithms. Mining can be done in various ways. Proof-of-work (POW) and proof-of-stake (POS) consensus are two non-limiting examples of how mining can be done.

Proof-of-stake may refer to a consensus algorithm in which validators secure new blocks before they are added to a blockchain network. In a POS mining algorithm, a node may participate in the mining process by staking an amount of digital assets. The POS may be a deterministic concept that states individuals are allowed to mine or validate new blocks equal to proportionally to the amount staked—in other words, the more digital assets a node stakes, the greater mining power the node has. In some cases, greater mining power means that a node has more opportunity to validate blocks and be rewarded. Opportunity may refer to probabilistic opportunity, in which a probability $p_1 > p_2$ does not necessarily guarantee that a first node with higher probability $p_1$ actually mines more than a second node with lower probability $p_2$ over a specific period of time. However, long-run, expected value of miners with larger staked amounts may be greater than those of miners with smaller staked amounts.

A node may become a miner by staking an amount of digital assets from the miner's blockchain wallet by transferring digital assets to a bound wallet. Miners, who may be called validators, delegates, or forgers, may be chosen or voted for randomly by holders of digital assets on the blockchain network. For a node to be chosen as a staker, the node needs to have deposited a certain amount or value of digital assets into a special staking wallet. In at least some embodiments, miners are entitled to forge or create new blocks proportional to the amount staked. In some embodiments, mining is managed by a service provider, which provides the computing resources that are needed to record new data to a ledger.

POS blockchain networks may have several important differences from POW blockchain networks. In general, anyone with enough digital assets can validate transactions on a blockchain network, and the benefits of specialized hardware such as application-specific integrated circuits (ASICs) is less pronounced than in POW blockchain networks. Generally speaking, POS blockchain networks may be more energy efficient and environmentally friendly than POW blockchain networks. Non-limiting examples of POS blockchain networks include: DASH; NEO; Lisk; Stratis; PIVX; OkCash; and more. Generally speaking, in a POW blockchain network, nodes with greater computing power are more likely to mine new blocks, whereas in POS blockchain networks, nodes with greater staking amounts are more likely to validators.

Figure 3:
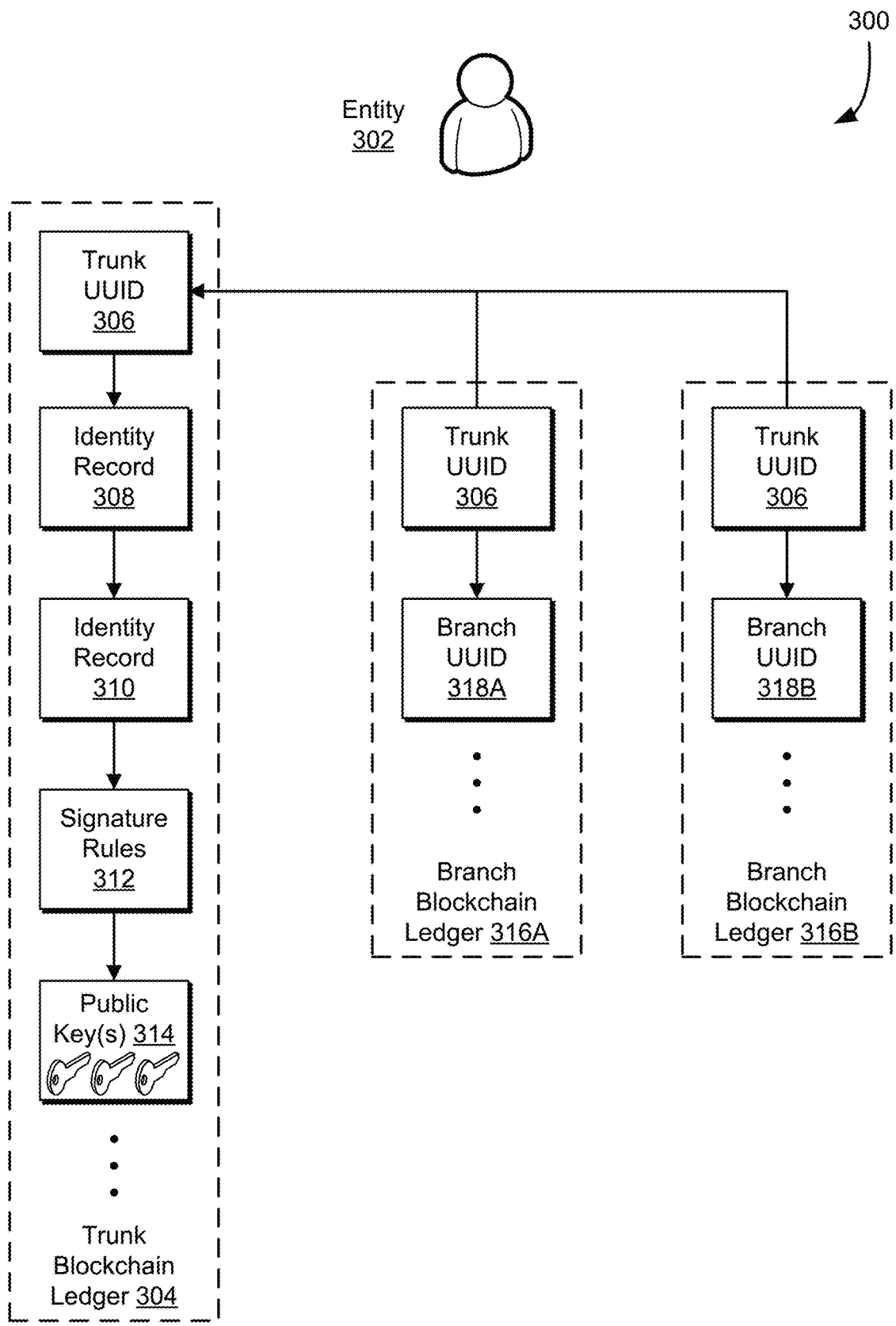
FIG. 3 illustrates a detailed view of a trunk blockchain ledger, in accordance with one or more example embodiments of the present disclosure.

FIG. 3 illustrates a computing environment 300 depicting a detailed view of a trunk blockchain ledger, in accordance with one or more example embodiments of the present disclosure.

Entity 302 may refer to the entity (e.g., organization or individual) that uses a trunk and its branches for verification purposes. Entity 302 may create trunk blockchain ledger 304. Trunk blockchain ledger 304 may be created with a trunk universally unique identifier (UUID) or other type of uniquely identifiable identifier. The general concept is that an identifier of a trunk or branch is used to access the trunk or branch, and that by using a UUID, GUID, etc., it is not practically possible to guess the UUID of a trunk or branch successfully. Trunk blockchain ledger 304 may include one or more identity records such as identity record 308, identity record 310, and so forth, which are depicted for illustrative purposes only. Greater or fewer numbers of identity records (e.g., zero) may be present. Identity records can be used to store information that attests to the identity of the individual that owns trunk blockchain ledger 304. For example, an identity record may include name, address, email address, etc. information about the user. In some embodiments, a user confirms an email registration by clicking on a verification link send in an email message to the user's email address, and the identity record indicates that the trunk is associated with the particular email address.

The trunk UUID 306 or a quantity derived from it (e.g., a URL) can be used to access the trunk. For example, if entity 302 shares the trunk UUID 306 for trunk blockchain ledger 304 to another entity, that entity can resolve the UUID 306 to a network address or location where trunk blockchain ledger 304 can be accessed, and application software can be used consume the data in the blockchain ledger.

Trunk blockchain ledger 304 may comprise signature rules 312 and one or more public keys 314. Signature rules 312 may refer to rules that govern how records can be added to the trunk and/or branch. For example, the signature rules 312 may specific a N-of-M signature scheme is required to add records to any branches that derive from the trunk. The N-of-M signature scheme may require signatures from the set of keys identified in public keys 314. In some cases, the trunk is immutable such that no data can be added or removed from a trunk subsequent to its creation. In some embodiments, public keys 314 refer to cryptographic keys that can be used to verify digital signatures, encrypt data, and so forth. Corresponding private keys may be used to create digital signatures, decrypt data, and so forth. A key pair may refer to a public key and its corresponding private key. In various embodiments, data that is generated in branches is required to follow signature rules 312. The signature rules 312 may, for example, require that each record of added to the child branches are digitally signed and can be verified using public keys 314. Accordingly, control of private keys is, in various embodiments, a prerequisite for being able to publish data to branches.

Entity 302 can create one or more branches off of a trunk, according to various embodiments. For example, FIG. 3 depicts an example in which entity 302 creates two branches off of trunk blockchain ledger 304—a first branch blockchain ledger 316A and a second blockchain branch ledger 316B.

Branch blockchain ledger 316A includes a refer to the parent trunk. This may be in the form of trunk UUID 306, as depicted in FIG. 3. Each branch may, additionally, have its own unique identifier. This is depicted as branch UUID 318A for branch blockchain ledger 316A and branch UUID 318B for branch blockchain ledger 316B.

It is noted that different claims can be added to branch blockchain ledger 316A and branch blockchain ledger 316B. For example, a user can tailor a first branch to encode a resume with information pertinent to a management position, whereas a second branch can be tailored to emphasize information pertinent to an engineer position. There can be overlapping claims among multiple branches. If the same claim is made in multiple branches, they can all be confirmed by a single endorsement (many-to-one relationship).

Additionally, knowledge of branch UUID 318A and trunk UUID 306 does not divulge information as to the existence or contents of other branch. For example, in this case, a job applicant may submit branch blockchain ledger 316A as an endorsed resume to a first company and branch blockchain ledger 316B as an endorsed resume to a second company, and neither company would have knowledge that the individual is also seeking a job at the other company.

Branches are private in the sense that the information used to access the branches (e.g., branch UUID in FIG. 3) is not made publicly available by default and access is provided by entity 302 sharing the branch UUID. Furthermore, branches can only be written to by entity 302 or other entities that have access to private keys, according to at least one embodiment of the present disclosure. Accordingly, entity 302 can create a branch with a randomly selected UUID and then share the branch with another entity or keep it private from other entities.

Figure 4:
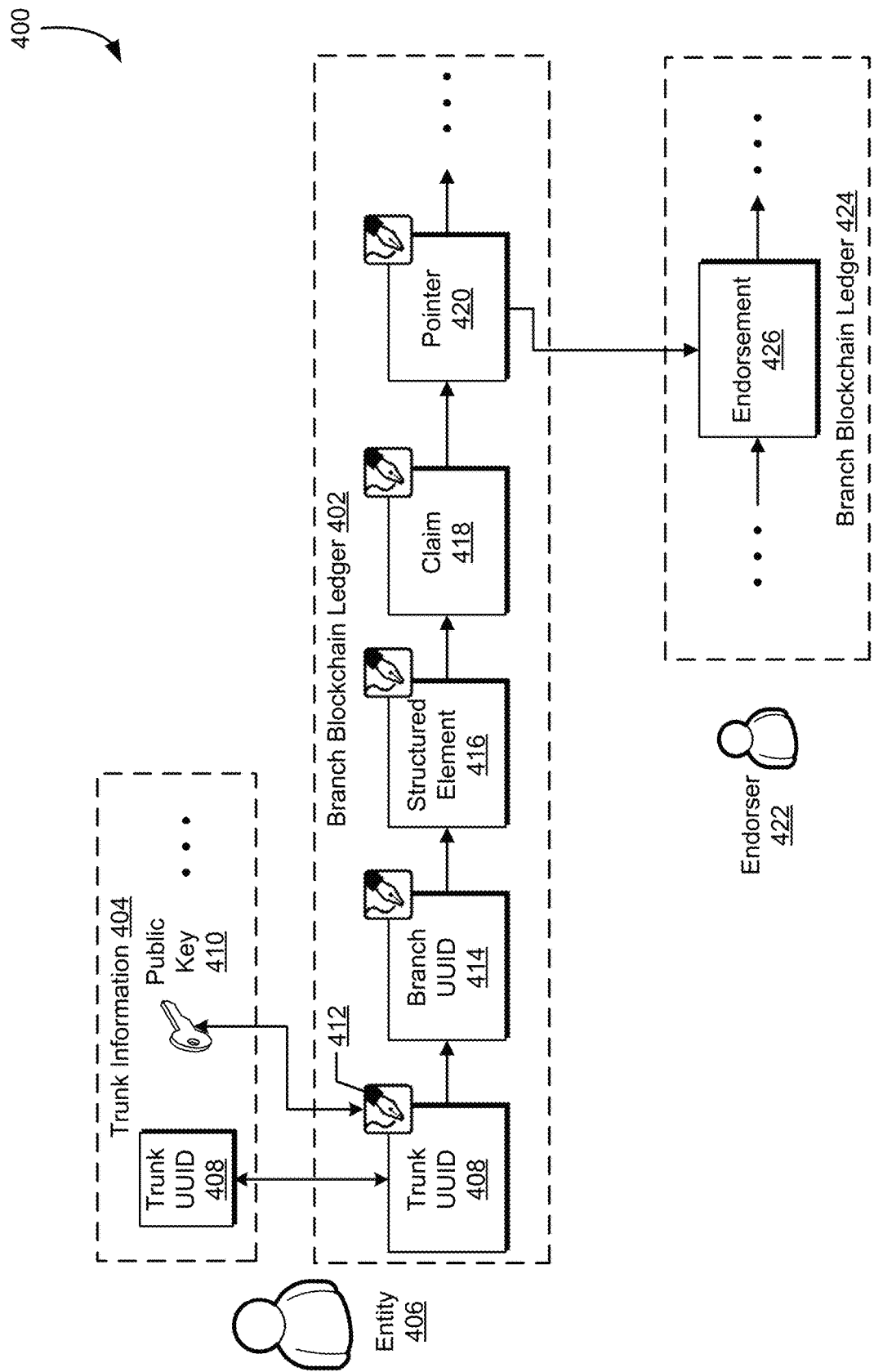
FIG. 4 illustrates a detailed view of a branch blockchain ledger, in accordance with one or more example embodiments of the present disclosure.

FIG. 4 illustrates a computing environment 400 depicting a detailed view of a branch blockchain ledger 402, in accordance with one or more example embodiments of the present disclosure.

Branch blockchain ledger 402 may be a branch, for example, as discussed in connection with FIGS. 1-3, and may be implemented as a child branch of a trunk using trunk information 404. Branch and trunk may be associated with entity 406, which may be an individual organization, etc.

Trunk information 404 may include data records that are immutably recorded to a trunk blockchain ledger, such as a trunk UUID 408 and a public key 410. As described elsewhere, the trunk may include signature rules and other information that governs how data is recorded to branch blockchain ledger 402. For example, each record in branch blockchain ledger 402 may be required to have a digital signature in order to be confirmed as valid. In various examples, the genesis block of a branch includes a first UUID of the parent from which the branch builds from, and a second UUID that identifies the branch.

As an example, a genesis block of a branch may be required to have a parent UUID, followed by an instant UUID of said branch. In some embodiments, the genesis branch includes both the parent UUID and the instant UUID. Regardless, any suitable implementation may be utilized, so long as the protocol or rules used to create child branches allows for the branch's own UUID to be uniquely and deterministically resolved.

In various embodiments, records of the branch blockchain ledger 402 are digitally signed. For example, FIG. 4 depicts a digital signature 412 that is generated by entity 406 using a private key such that the digital signature 412 can be verified by public key 410 that is recorded in the trunk. When entity 406 records data to branch blockchain ledger 402, the data is accompanied by a digital signature generated using a private key. The use of such signature scheme may, in some embodiments, be used to restrict the parties that are allowed to generate new data to a branch. In some embodiments, the signature rules are used to ensure that the owner is able to write to branches and that others are able to read the contents of the ledger but not modify it. In some embodiments, the keys are managed by different agents of an organization such that a first employee of an organization may be allowed to write to his or her dedicated branch within an organization's hierarchy and a second employee is able to write to a different dedicated branch within the organization's hierarchy. Each employee may have his or her own private key, providing assurances of non-repudiation as to which data elements were recorded by which employees.

In some embodiments, a sub-branch can be implemented as a child of branch blockchain ledger 402 using techniques described above. For example, FIG. 4 can, in some embodiments, be extended with a sub-branch wherein the sub-branch includes a parent identifier as branch UUID 408 in the genesis block and then a sub-branch UUID that is different from branch UUID 414. The sub-branch may include structured elements, claims, endorsement pointers, and so forth that follow the signature rules described in the trunk, which can be de-referenced in the sub-branch by traversing to the parent branch, which includes trunk UUID 408.

Structured element 416 refers to structured data allow a branch blockchain ledger 402 to be interpreted by applications. In various embodiments, information that is not subject to verification is recorded as structured elements. In the context of an endorsed resume, this may include a statement of a job seeker's career goals or hobbies. In some embodiments, a structured element includes presentation information, grouping information (e.g., grouping a claim with some data that augments the claim, but the extra data is difficult or impossible to validate via endorsement), labels, objectives, and so forth. Generally speaking, information that may be helpful or valuable—but does not need to be endorsed—can be stored as a structured element.

Claim 418, in various embodiments, refers to a verifiable statement that typically relates to a real-world or off-chain fact or event. For example, a claim may be that an individual attended a certain college, earned a certain degree, completed a certificate program, worked at a certain company over a certain time period, that the Atlanta Braves won the 2021 World Series, and so forth. In various embodiments, a claim is characterized in that its veracity is immutable—that is, that the truthfulness of a claim does not change over time. This constraint may be used to ensure that once an endorser has verified a claim, that the endorsement of the claim should not need to change in the future. For example, a claim that the Atlanta Braves won the 2021 World Series can be verifiable at any point in time, and will hold true into the future. In contrast, a statement that an individual's favorite movie is Titanic is typically not considered immutable, as the individual's tastes may change over time, and would not typically be considered information that is included in claim 418. Claim 418 may be encoded in a human-readable format just as JSON, and may be encoded in a plaintext format so that it can be viewed, for example, by an endorser.

Endorsement pointer 420 refers to a data structure that is recorded to branch blockchain ledger 402 that references a claim and an endorsement. In various embodiments, pointer 420 is used to indicate that a particular claim on branch blockchain ledger 402 has been endorsed by another party, such as endorser 422. Pointer 420 may include a UUID or other network information that references a second branch blockchain ledger 424 controlled by endorser 422 and may reference a specific block or transaction ID that uniquely and deterministically resolves to endorsement 426.

In various embodiments, endorsement 426 stores a cryptographically verifiable attestation of the verification of claim 426. For example, endorser 422 may review the veracity of claim 418 and upon validating the claim 418, endorse the claim as being true by generating a hash over the claim 418 and recording the hash as endorsement 426 on branch blockchain ledger 424. Thus, instead of holding a duplicate of the claim information in the endorsement, a hash of the original claim can be recorded to branch blockchain ledger 424, which is typically a fixed-size quantity that reduces the storage space needed for validation. Furthermore, endorser 422 can allow multiple entities to view branch blockchain ledger 424 without compromising the privacy of claim 418 as the properties of hashes or other one-way functions can be used to protect the privacy of the claim information.

Accordingly, endorser 422 can utilize branch blockchain ledger 424 to record several endorsements for several entities. For example, endorser 422 may be an organization such as a background check company that validates, as a proxy, information submitted by job applications in resumes. Background checks may be conducted for many individuals, and each individual's claims regarding their work histories, education, certifications, etc. can be validated, hashed, and then recorded to branch blockchain ledger 424 next to each other without comprising the privacy of the underlying claims made by each job seeker. Branch blockchain ledger 424 could, in at least some cases, be made publicly accessible for anyone to view, as the endorsement information included in the branch would require claim 418 to decipher the endorsement 426. Branch blockchain ledger 424 may follow signature rules encoded in a parent branch, as described elsewhere in this disclosure.

In some embodiments, endorsement 426 can be generated prior to a claim 418. For example, an endorsement may be generated based on input data that is according to a predetermined format or structure and agreed upon by the endorser and the eventual claimant. One such example is, for example, in the realm of prescriptions. A doctor could create a digital prescription for a specific drug, a specific dosage/amount, etc., generate an endorsement by hashing such information, and record an endorsement comprising a hash that encodes the prescription information to a prescription endorsement branch blockchain ledger that is managed by the doctor's office. A patient may be provided with a reference to the prescription endorsement and the input that was used to generate the hash. The patient may, upon arriving at a pharmacy of his or her choosing, generate a claim from the prescription information and a corresponding pointer to the already-recorded endorsement for the digital prescription. The patient may, accordingly, take the digital prescription and have it filled at any pharmacy of his or her choosing. This type of validation model is in contrast to conventional systems. In this blockchain-based implementation, control of the prescription information is managed by the patient, whereas in conventional systems, the doctor's office is required to call in the prescription to a specific pharmacy, limiting the patient to being able to have the prescription filled by a single location unless additional measures are taken (e.g., requesting that the pharmacy transfer the prescription to another location). Techniques described herein improve upon this burdensome process by having the doctor's office provide the endorsement directly to the patient and allowing the patient to control how the prescription is filled. The pharmacy is able to validate, via the endorsement, that a prescription was issued by a doctor's office. In some cases, the validation may also include verifying, via a certification branch blockchain ledger, that the doctor's office has a claim that it is certified and authorized to issue prescriptions and that claim is endorsed by an appropriate agency.

FIG. 5 illustrates a diagram 500 of a claim made by a first party and an endorsement of such claim by a second party, in accordance with one or more example embodiments of the present disclosure.

Claimant 502 may refer to an entity such as an individual or organization (e.g., agent of the organization) that makes a claim and requests that the claim be validated by an endorser 504. Endorser 504 may refer to a trusted party whose endorsement is recognized as having value. For example, a claimant may be a roofing company that requests that an insurance company act as an endorser by validating that the claimant has an insurance policy. The endorsement of an insurance policy may indicate a start and end time to the policy. FIG. 5 depicts an example in which a claimant submits claim request 506 to endorser 504, requesting that endorser 504 provide an endorsement of an employee's work history. In various embodiments, endorser 504 is a proxy or trusted third party such as a background check company that performs the verification check, by seeking confirmation from another party. For example, when reviewing a job applicant's past work experience, a background check company may contact the applicant's previous employer to confirm that the claimed work history is accurate.

A claim request, in at least some embodiments, comprises a human-readable, plaintext claim statement. For example, claim request 506 depicted in FIG. 5 comprises a statement in a JSON format and as plaintext:

```
{
    name: "Joe Somebody",
    employer: "XYZ Corp",
    start: "01-01-2005",
    end: "01-01-2007",
    title: "Sr. Engineer",
}
```

The claim statement may be recorded to a branch in a plaintext format. For example, claimant 502 may record a claim to a branch and send a UUID of the branch to endorser 504. Claimant 502 can request endorser 504 to verify the claim and provide an endorsement to the validity of the claim.

Endorser 504 may receive the claim request 506 and annotate the claim. In some embodiments, endorser 504 adds additional information to produce a verified claim, such as information about the verification company, an agent within the company that performed the verification, how the verification was performed, and so forth. For example, endorser 504 may provide metadata associated with the endorsement in an endorsement record. The endorsement may include additional information regarding the entity and/or individual that is endorsing the claim. For example, the metadata may include a verification_company and verified_by_person field that indicates the company and individual (e.g., employee or agent) that reviewed the claim:

```
{
    name: "Joe Somebody",
    employer: "XYZ Corp",
    start: "01-01-2005",
    end: "01-01-2007",
    title: "Sr. Engineer",
    verification_company: "Verify Co.",
    verified_by_person: "Naomi"
}
```

Endorser 504 may generate a hash over the above statement. For example, the claim statement and verification metadata may be provided as an input to a one-way hash function to produce a hash output:

HASH: 0020c0336e43d498dbbf5c25758ed751f67b19ec

Endorser 504 may record the hash to a branch it controls. The hash output and the data used to produce the hash output may be provided by endorser 504 to claimant 502 as an endorsement response 508. Claimant 502 may record an endorsement pointer that includes the hash and the corresponding input used to create the hash. In some cases, the corresponding input encodes the location of the endorsement.

An endorsement workflow typically involves two entities—a claimant 502 and an endorser 504. Endorsement workflows described herein can be integrated with an endorsed resume architecture, but can also be separated from endorsed resumes and used outside of the context of endorsed resumes.

Different data structures are utilized by a claimant and endorser, according to various embodiments. A claimant data structure, according to various embodiments, comprises one or more claim elements, an endorsement status, and a workflow task context. Claim elements refer to claims of off-chain events or purported facts which may or may not be true, but are verifiable either from a trusted or canonical source (e.g., an employer can serve as a trusted source that an individual worked for the employer over a certain time period) or from a consensus or reputation based mechanism.

Endorsement status may be used to connect an endorsement task or workflow to a claim. The claim element can be used to discover the resume, user and so forth. Endorsement status can also be used to track the last time a user checked the workflow task for changes, so that it is easily discoverable whether a task has been updated since the last time that a claimant checked the status of an endorsement.

A workflow task context comprises a workflow task, workflow task messages, and task data or copies thereof. Initially, task data is a copy of the claim element data, but over time, the task data is incrementally updated to reflect changes. The workflow task disposition relates to the final status of a task, and if the task was completed successfully (e.g., resulting in endorsement of the claim). Workflow task disposition includes encoded information about the endorsement. As part of a workflow task, a claim request 506 with a copy of claim element data may be sent by claimant 502 to endorser 504. In some embodiments, a claim is recorded to claimant's blockchain ledger and a reference to the claim is sent as part of the request, reducing the amount of data that is needed to be transmitted by claimant 502 to endorser 504.

On the endorser 504 side, an endorsement task assignment refers to a connection or association between an endorser user and a workflow task. This may be equivalent or complementary to the endorsement status on the claimant side that maintains state regarding when the last time the endorser looked at a particular workflow task, so that it is discoverable whether the task has been updated recently.

Workflow task context on the endorser side may be the same as with the claimant side. In some cases, workflow task context includes additional information that is private and not made accessible to the claimant, these may include internal notes, annotation, metadata, etc. that are for the endorser or agents thereof. Public information may be added, such as information regarding the verifier (e.g., the company and/or agent that performed the verification) and a reference to the branch and/or record where the endorsement is or will be located.

The claim and endorsement workflow can be an implementation that is content agnostic in terms of what was stored in it. A resume is one kind of thing that could build a claim and endorsement. As a second example, a roofing company can put a proof of insurance on their blockchain and the insurer can put an endorsement that the company has insurance. As yet another example, the claim and endorsement can be used to provide attestations as to the occurrence of real-world, off-chain events, such as receiving a digital certification that a person have been skydiving. The claim request in this case would include information indicating that the individual went skydiving on a certain date, at a certain place, etc., and the endorsement could be issued by the skydiving company or a witness to the event. In some embodiments, endorsements can be an attestation that is generated independent of a claim request. For example, a bank could compute a hash of a customer's monthly balance on a branch each month, irrespective of any claim requests. In some cases, salts may be used to increase the computational difficulty of guessing the underlying information that is hashed. These hashes could be used subsequently on a mortgage application to prove that the applicant's financial history in a mortgage application is correct.

Figure 6:
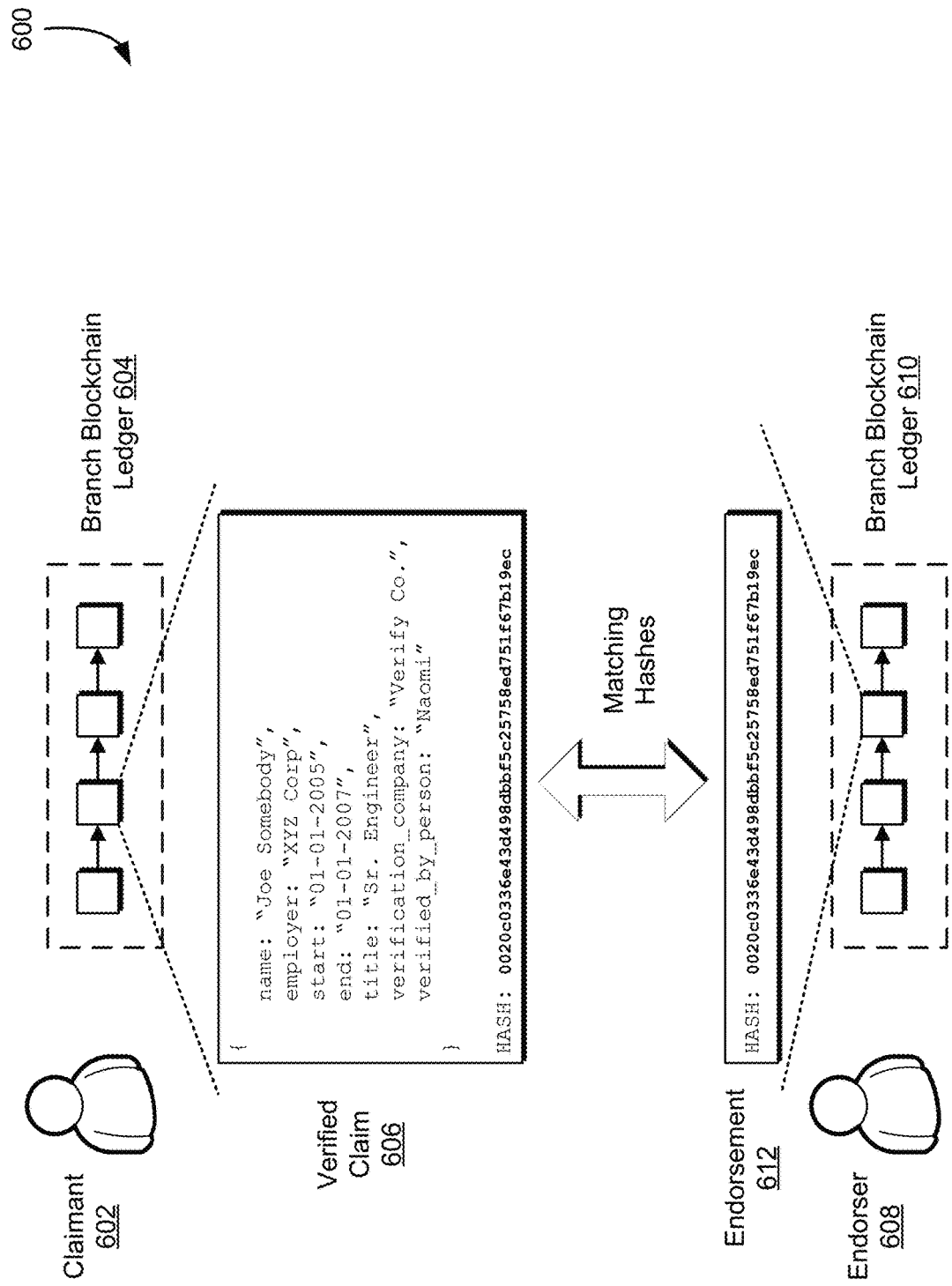
FIG. 6 illustrates a verified claim stored on a first branch blockchain ledger and a corresponding endorsement stored on a second blockchain ledger, in accordance with one or more example embodiments of the present disclosure.

FIG. 6 illustrates a computing environment 600 of a verified claim stored on a first branch blockchain ledger and a corresponding endorsement stored on a second blockchain ledger, in accordance with one or more example embodiments of the present disclosure. The second blockchain ledger may refer to a branch blockchain ledger controlled or managed by the endorser, a second trunk blockchain ledger controlled or managed by the endorser, or generally speaking, any suitable blockchain ledger. For example, the endorser may generate endorsements and broadcast them to public blockchain ledgers, such as Bitcoin or Ethereum.

Claimant 602 may control branch blockchain ledger 604 and record verified claim 606 to a branch that the claimant controls. The verified claim 606 may be in a JSON format and in plaintext:

```
{
    name: "Joe Somebody",
    employer: "XYZ Corp",
    start: "01-01-2005",
    end: "01-01-2007",
    title: "Sr. Engineer",
    verification_company: "Verify Co.",
    verified_by_person: "Naomi"
}
```

In some embodiments, the verified claim 606 is digitally signed by a private key that is controlled by claimant 602 to provide assurances of non-repudiation as to the fact that the claimant 602 is making the claim that he was a senior engineer and that his work history was verified by Verify Co. The verified claim 606 may include a hash of the verified claim statement:

HASH: 0020c0336e43d498dbbf5c25758ed751f67b19ec

Endorser 608 may control branch blockchain ledger 610 and record an endorsement of the verified claim 606. The endorsement may simply be a hash of the claims statement. Because the Endorsement is a hash of the original data, the endorsement information can be placed out publicly on the Internet, and no one will be able to tell what it means. Endorser 608 can share the UUID of branch blockchain ledger 610 with various parties and without divulging any information regarding verified claim 606.

Figure 7:
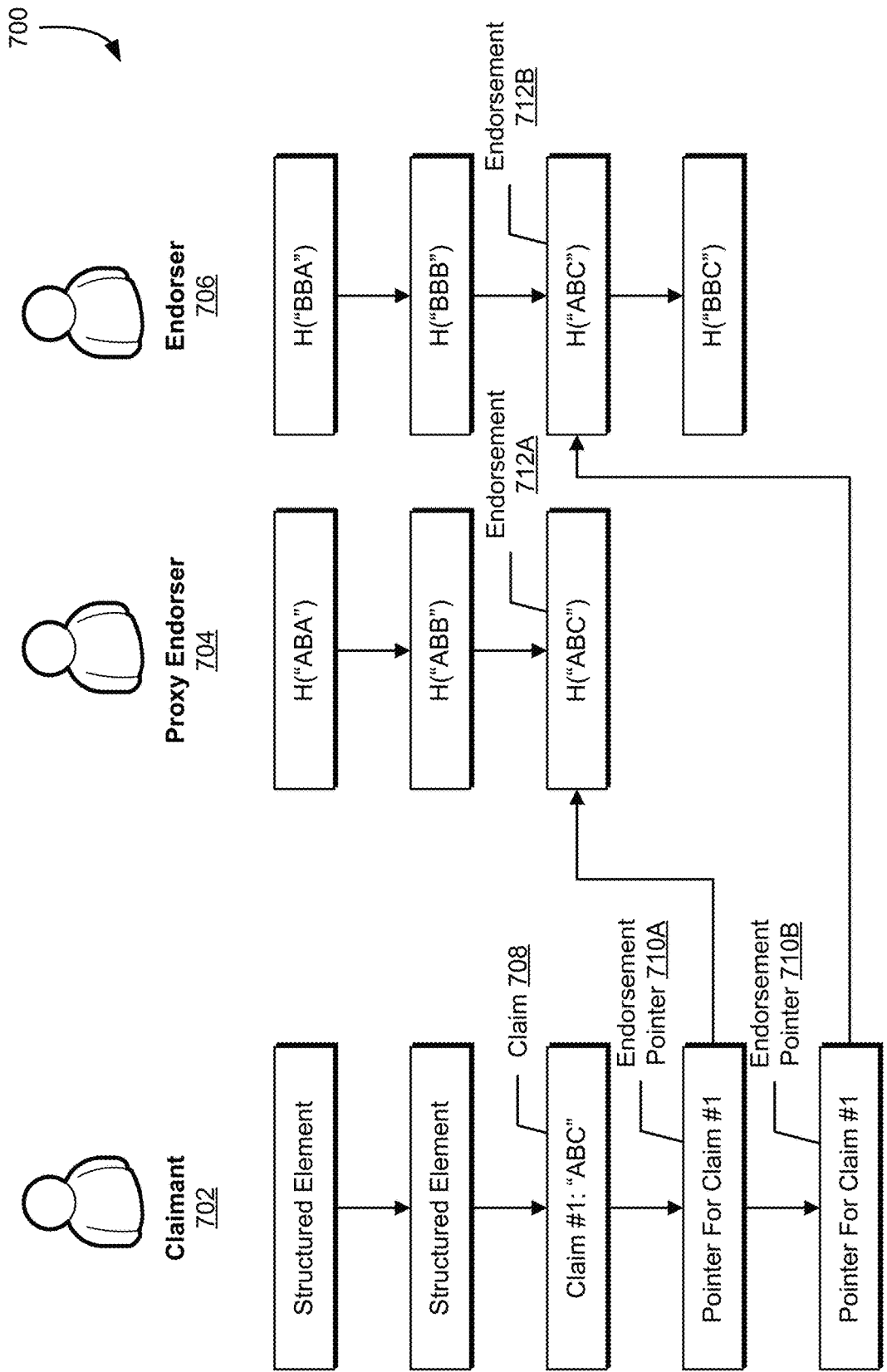
FIG. 7 illustrates multiple endorsements for a claim (e.g., by a proxy and by a first party), in accordance with one or more example embodiments of the present disclosure.

FIG. 7 illustrates a computing environment 700 depicting multiple endorsements for a claim (e.g., by a proxy and by a first party), in accordance with one or more example embodiments of the present disclosure. FIG. 7 depicts claims and endorsement relationship for claimant 702, proxy endorser 704, and endorser 706. Corresponding branches of each of the three entities are also depicted in FIG. 7.

Claimant 702 may refer to an entity that makes claim 708. The claim may be a prior work experience of a job applicant, that the claimant is insured, and so forth. A claim, by itself and without a corresponding endorsement, may be considered an unverified statement. Claim 708 may have corresponding endorsement pointer 710A that references endorsement 712A from proxy endorser 704 and endorsement pointer 710B that references endorsement 712B from endorser 706. In a job application scenario, the claimant may be a job applicant, the proxy endorser 704 may be a background check company, and the endorser 706 may be a company that claimant 702 previously worked for or is currently working for.

Structured elements are used to hold data such as a header record, a job applicant's personal objective, formatting and font information for generating a graphical presentation of a resume, and other information that is not readily susceptible to verification or is subjective in nature. Data that does not need to be validated can be stored as a structured element. In some embodiments, structured element is a catch all for anything that is not a claim, endorsement, or pointer.

Different types of claims may carry different weight. For example, in the case of a job applicant, a proxy endorser may be used to validate information that the applicant includes in his or her resume. This may be done for expediency—namely, that charging a single entity with verifying an applicant's entire work history may require less coordination of effort than seeking individual endorsements from every previous employer an applicant has worked for. So long as the proxy is trusted, the weight given to the proxy endorsement may be considered of high value.

As a second example, a proxy endorser 704 may be used to obtain the endorsement of an applicant's current employer so as to not alert the current employer that their employee is applying for other jobs. If the claimant leaves the company and then requires verification for a subsequent job search, then the direct endorser (e.g., endorser 706) may be used to provide a direct endorsement of the work history that strengthens the claim.

In contrast to objective claims, subordinate claims may refer to subsidiary facts that are more difficult to validate in a formal and consistent. For example, while an objective claim may be claim that a person worked at a certain company, subordinate claims to such an objective claim may be that the person worked on a specific project, managed certain employees, won certain internal organization awards, and so forth. While a company's HR department may be able to validate some of these subordinate claims, others may not be information that can be easily ascertained by an organization and hence, may be more difficult for an organization to endorse. Subordinate claims may be used as a consensus-building mechanism to establish the veracity of a claim. These claims are endorsed based on individual reputation rather than reliance on official documents. Subordinate claims can be endorsed by various individuals and entities. For example, a series of co-workers can endorse that an employee is skilled at project management. The weight given to different endorsements can differ. For example, if an endorser can be verified as having been an employee at ABC Corp. the same time that Joe Person was, that may lend weight to an endorsement that she worked with Joe Person directly and endorses his project management skills.

Different numeric weights and scores can be conferred upon the validation of weights. For example, if a series of subordinate claims are made by claimant 702, the weight of various endorsements on the claim may be considered based on information available about the endorsers and their relationships. In the case of objective claims, there is typically a well-understood hierarchy of trust—for a job applicant's work history, verification by the employer may be considered of the highest value, and verification by a trusted third party such as a background check company that the individual or organization reviewing the application regards in good standing may be considered slightly inferior or even at the level of an employer's verification. An endorsement by the manager of the applicant may be considered as having some value, and of lesser value may be endorsements by colleagues.

Subordinate endorsements can be evaluated based on their trustworthiness and scored based on whether there is see a consistency with those individual's own objective endorsements. For example, if Kyle is objectively endorsed as an employee of XYZ Corp. (e.g., by the employer), his endorsement of a subordinate claim that he worked with Joe Person on a particular project may be afforded weight as there is some assurance that Kyle was an employee at XYZ Corp. and that he could be qualified to provide endorsements as to which projects Joe Person worked on.

Figure 8:
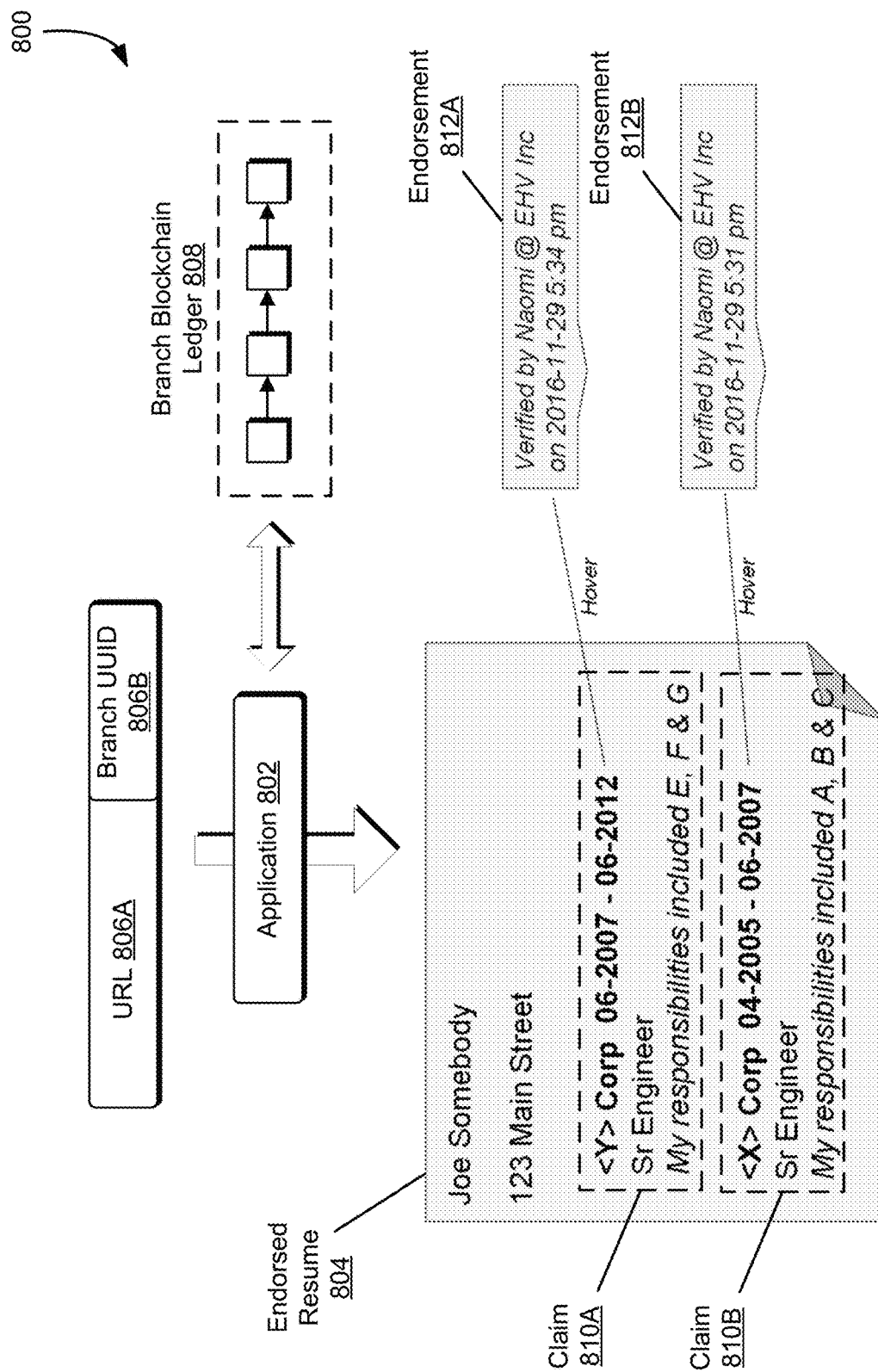
FIG. 8 illustrates a computing environment in which an application generates an endorsed resume based on verifiable claims stored on a blockchain ledger, in accordance with one or more example embodiments of the present disclosure.

FIG. 8 illustrates a computing environment 800 in which an application 802 generates an endorsed resume 804 based on verifiable claims stored on a blockchain ledger, in accordance with one or more example embodiments of the present disclosure. While an endorsed resume use case is depicted in FIG. 8, there are other examples in which the blockchain-based verification techniques described herein may be used to validate the veracity of off-chain claim statements.

Application 802 may refer to a software application that is used to interpret blockchain ledger data and present it to users in a graphical interface. Application 802, in at least one embodiment, can be implemented as an Endorsed Resume application that lets users create claims, have the claims validated by trusted parties, and share endorsed resumes with parties of interest, such as prospective employers.

Using the endorsed resume application as an illustrative example, a job applicant fills out information about his or her work history in application 802 including one or more claims such as claims 810A and 810B and the individual claim elements may be shared with endorsers for endorsement. In various embodiments, a proxy such as a background check organization attempts to verify claims such as work experience and education. The background check organization may record endorsements on their own branch, and the endorsements can be referenced by the applicant in his or her endorsed resume.

The endorsed resume can be shared via a network link such as URL 806A that includes a branch UUID 806B. For example, the branch UUID may be part of an HTTP web link that directs application 802 to branch blockchain ledger 808. The branch blockchain ledger may include both the applicant's claims 810A and 810B, as well as structured elements that include the applicant's name, address, etc., as well as formatting information that is used to determine how to render the endorsed resume graphically. Branch blockchain ledger 808 may furthermore include endorsements 812A and 812B corresponding to claims 810A and 810B. When a hiring manager reviews the endorsed resume, they can mouse over the claims to see that the claims have been verified, giving the hiring manager greater assurances as to the qualifications of the endorsed resume user.

Figure 9:
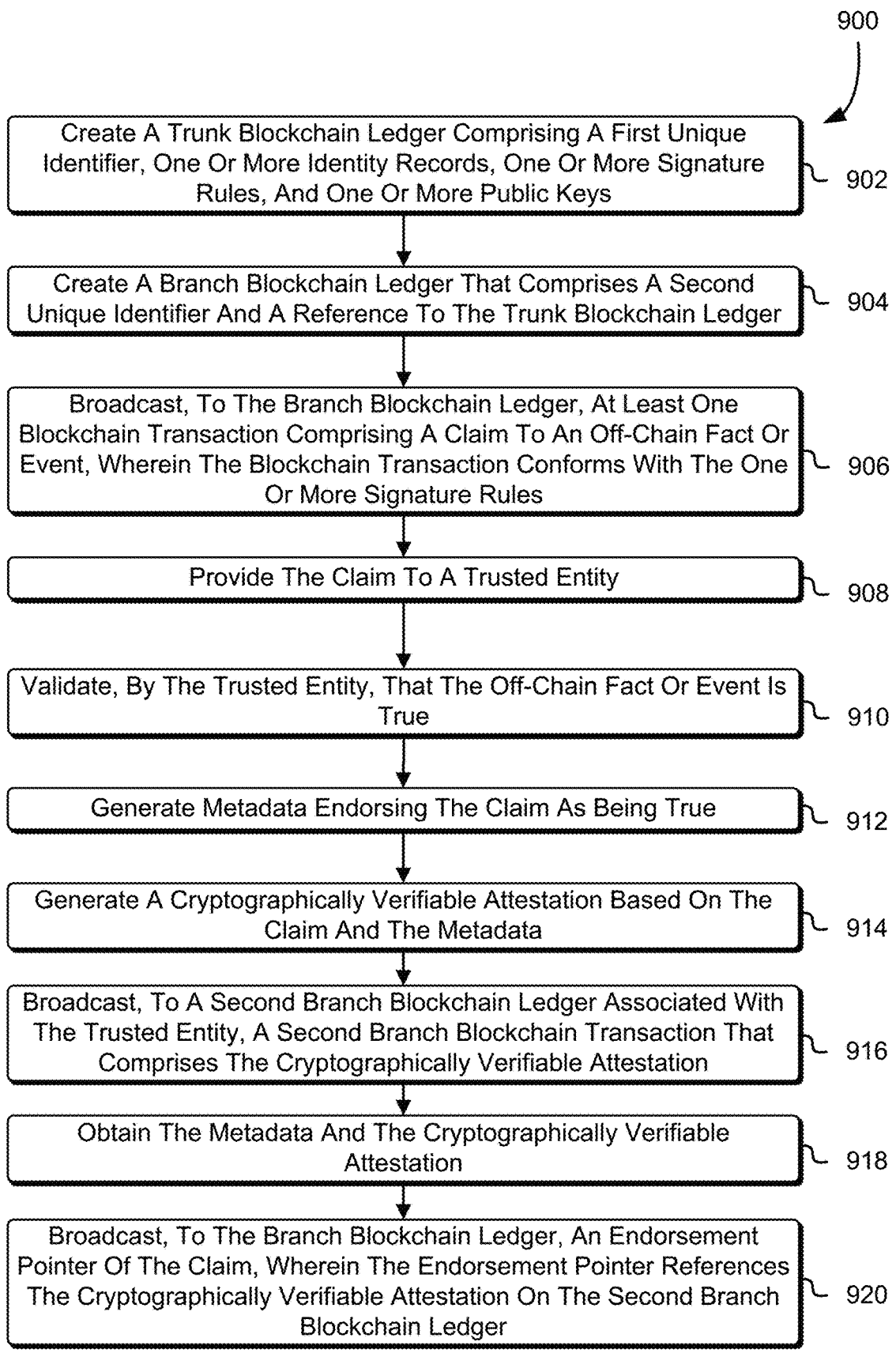
FIG. 9 shows an illustrative example of a process for provisioning a blockchain-based environment for making verifiable claims, in accordance with one or more example embodiments of the present disclosure.

FIG. 9 shows an illustrative example of a process 900 for blockchain-based claims and endorsements, in accordance with one or more example embodiments of the present disclosure. In at least one embodiment, some or all of the process 900 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 900 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 900 may be implemented in the context of various systems and methods described elsewhere in this disclosure, such as those discussed in connection with FIGS. 1-8, 10 and 11. In at least one embodiment, process 900 or a portion thereof is implemented by a computing resource service provider.

In at least one embodiment, process 900 comprises a step 902 to create a trunk blockchain ledger comprising a first unique identifier, one or more identity records, one or more signature rules, and one or more public keys. The trunk may be described in accordance with FIG. 3 and elsewhere. The trunk may include a trunk identifier (e.g., UUID) and may be associated with an entity. The entity may be expected to retain control of private keys that are used to create branches and insert records into the branches.

In at least one embodiment, process 900 comprises a step 904 to create a branch blockchain ledger that comprises a second unique identifier and a reference to the trunk blockchain ledger. A branch may include, for example a reference to the trunk's UUID in a genesis block of the branch. Branch records are required to be digitally signed, according to various embodiments. Branches can be used to store various types of transaction records, including structured elements, claims, endorsements, endorsement pointers, and so forth.

In at least one embodiment, process 900 comprises a step 906 to broadcast, to the branch blockchain ledger, at least one blockchain transaction comprising a claim to an off-chain fact or event, wherein the blockchain transaction conforms with the one or more signature rules. A claim statement may refer to an assertion that may be objectively demonstrated to be true or false, such as whether Joe Person worked at XYZ Corp. from 2005-2007, whether the Atlanta Braves won the 2021 World Series, and so forth. The blockchain transaction may be signed using a digital private key of the entity that created the branch, or another entity that is designated as the owner of the branch. The branch may be implemented in accordance with techniques discussed in connection with FIG. 4.

In at least one embodiment, process 900 comprises a step 908 to provide the claim to a trusted entity. The claim may be provided in plaintext. In some embodiments, the claim is provided according to FIG. 5. In some cases, a claim statement is sent to a proxy or a direct endorser as a trusted entity.

In at least one embodiment, process 900 comprises a step 910 to validate, by the trusted entity, that the off-chain fact or event is true. Validation of the off-chain fact or event may involve real-world investigation, such as checking records of an organization's payroll, contacting an agency to determine whether a certification was issued to a claimant, and so forth.

In at least one embodiment, process 900 comprises a step 912 to generate metadata endorsing the claim as being true. This step may be performed upon a successful validation of the claim statement. In some embodiments, the metadata includes information regarding the endorser, such as the endorser's organization, the agent of the organization that verified the claim statement, how the claim statement was verified, and so forth.

In at least one embodiment, process 900 comprises a step 914 to generate a cryptographically verifiable attestation based on the claim and the metadata. A non-limiting example of a cryptographically verifiable attestation is a hash output generated from a SHA-256 hash algorithm. The cryptographically verifiable attestation may be used to provide privacy and confidentiality of the underlying claim, which cannot be practically reverse-engineered from the hash output. In some cases, the hash is generated based on the claim as a hash input.

In at least one embodiment, process 900 comprises a step 916 to broadcast, to a second branch blockchain ledger associated with the trusted entity, a second branch blockchain transaction that comprises the cryptographically verifiable attestation. The second branch blockchain ledger may be a branch that is controlled by the endorser, rather than the claimant. Broadcasting the cryptographically verifiable attestation may be appropriate even in cases where the second branch blockchain ledger is accessible by a large number of individuals or is considered to be public information that anyone can access. This is due to the fact that the hash cannot be used to reverse-engineer the underlying claim statement.

In at least one embodiment, process 900 comprises a step 918 to obtain the metadata and the cryptographically verifiable attestation. In some embodiments, the claimant receives the hash that was broadcasted to the endorser's blockchain. In some cases, the endorser provides the claimant with a reference to the endorsement on the endorser's branch. In at least one embodiment, process 900 comprises a step 920 to broadcast, to the branch blockchain ledger, an endorsement Pointer of the claim, wherein the endorsement pointer references the cryptographically verifiable attestation on the second branch blockchain ledger. The endorsement pointer may be in accordance with those described in connection with FIGS. 5 and 6. In various embodiments, the endorsement pointer includes a first hash of the claim that can be verified as being identical to a second hash that is stored on the second branch blockchain ledger.

Figure 10:
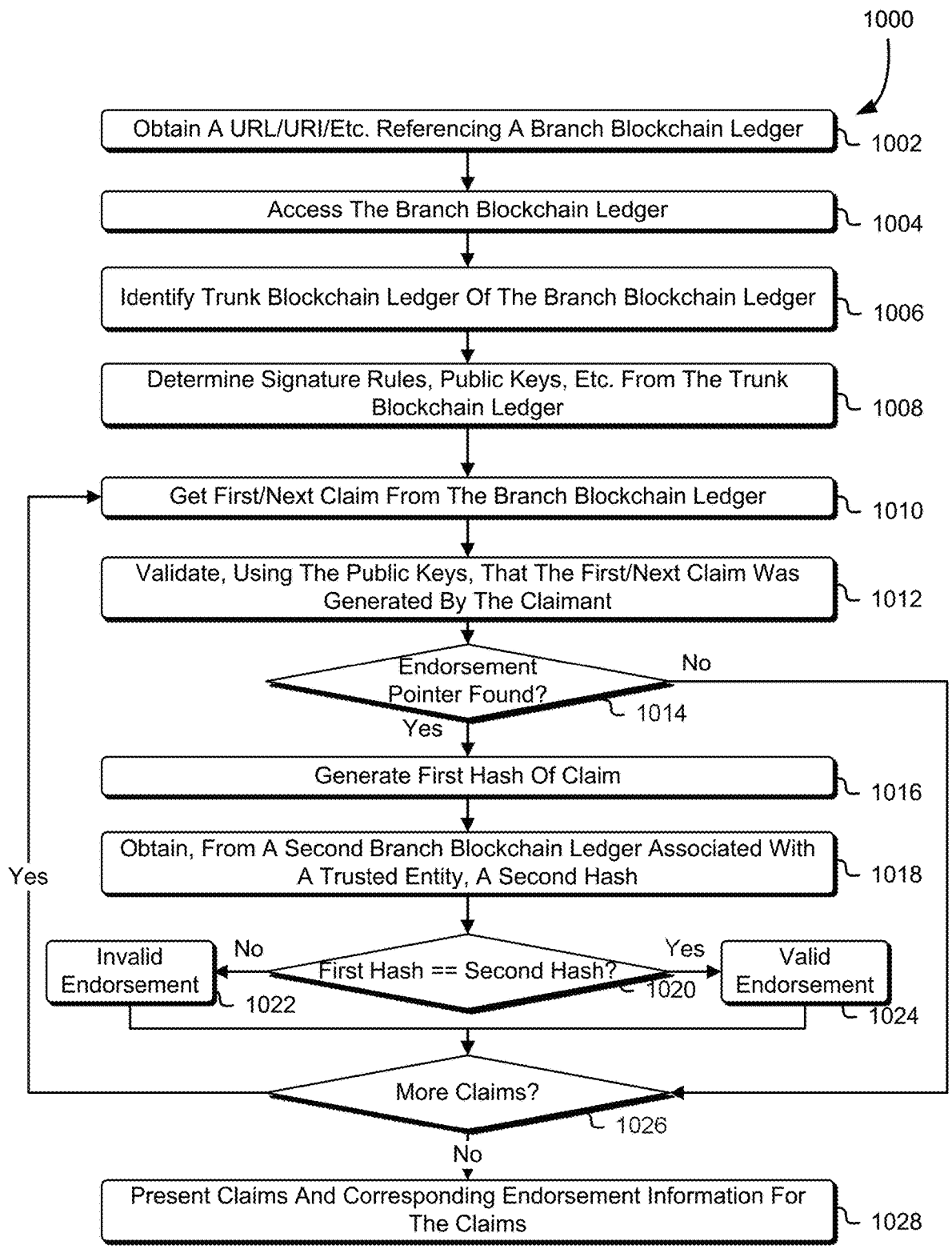
FIG. 10 shows an illustrative example of a process for accessing a blockchain-based ledger and verifying claims based on endorsement information included thereof, in accordance with one or more example embodiments of the present disclosure.

FIG. 10 shows an illustrative example of a process 1000 for blockchain-based claims and endorsements, in accordance with one or more example embodiments of the present disclosure. In at least one embodiment, some or all of the process 1000 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1000 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 1000 may be implemented in the context of various systems and methods described elsewhere in this disclosure, such as those discussed in connection with FIGS. 1-9 and 11. In at least one embodiment, process 1000 or a portion thereof is implemented by a computing resource service provider.

In at least one embodiment, process 1000 comprises a step 1002 to obtain a URL/URI/Etc. referencing a branch blockchain ledger. While URLs and URIs are described as illustrative examples, any suitable network address format can be provided. In at least one embodiment, process 1000 comprises a step 1004 to access the branch blockchain ledger. A software application may be used to access branch information at the URL/URI, determine whether claims included in the branch have been validated, and present the branch data in a graphical format that can be easily reviewed by an end user.

In at least one embodiment, process 1000 comprises a step 1006 to identify the trunk of the branch. The trunk information may be included in a genesis block of the branch. For example, a trunk UUI may be included in a genesis block of the branch that can be used to access information in the trunk. In at least one embodiment, process 1000 comprises a step 1008 to determine signature rules, public keys, etc. from the trunk blockchain ledger. The trunk information may be used to validate various aspects of branch records, such as being used to validate digital signatures on the branch.

In at least one embodiment, process 1000 comprises a step 1010 to get a first claim from the branch blockchain ledger. The claim may include a claim statement such as a job applicant's previous work history, education, and so forth. The claim may be implemented in accordance with FIG. 5. In at least one embodiment, process 1000 comprises a step 1012 to validate, using the public keys, that the first claim was generated by the claimant. A public key in the trunk may be used to validate a digital signature of the first claim. This may be used to ensure that the claim was actually made by the claimant.

In at least one embodiment, process 1000 comprises a step 1014 to determine whether an endorsement pointer for the first claim is found in the branch. If an endorsement pointer is not found, the process 1000 proceeds to step 1026 and may indicate a graphical icon alerting the end user to the fact that the claim has not been verified. If the claim was verified, then the process 1000 proceeds to step 1016 to generate a first hash of the claim by, for example, taking the claim on the branch blockchain ledger and providing it as an input to a hash function to produce the first hash as an output of the hash function. In at least one embodiment, process 1000 comprises a step 1018 to obtain, from a second branch blockchain ledger associated with a trusted entity, a second hash. The second hash may be a quantity that is recorded by the endorser on the endorser's own branch and cannot be unilaterally recorded without the endorser's consent.

In at least one embodiment, process 1000 comprises a step 1020 to determine whether the first hash on the claimant's branch matches the second hash found on the endorser's branch. If they match, it means that the first claim is a valid endorsement 1024. Determination of a valid endorsement may result in a check mark or other graphical icon being placed next to a claim that a reviewer can mouse over or otherwise interact with to view the endorsement information. On the other hand, if the hashes do not match, then the endorsement may be considered an invalid endorsement 1022 and a different graphical icon may be displayed warning the reviewer that the claim has not been validated.

In at least one embodiment, process 1000 comprises a step 1026 to determine whether more claims are included in the branch. If there are additional claims to validate, then steps 1010-1026 may be repeated for a second, third, fourth, etc. claim until all claims have been processed, at which point a step 1028 to present claims and corresponding endorsement information may be presented in a graphical user interface. Claims may be presented as resume items or bullet points, and endorsements may be presented as graphical icons, flags, or other information. The endorsement information can be displayed dynamically, such that when a user mouses over a claim or clicks on it, that additional information regarding the endorsement is presented, such as information about the endorser, when the endorsement was made, how the claim was validated, and so forth.

The above descriptions are for purposes of illustration and are not meant to be limiting. Numerous other examples, configurations, processes, etc., may exist, some of which are described in greater detail below. Example embodiments will now be described with reference to the accompanying figures.

Figure 11:
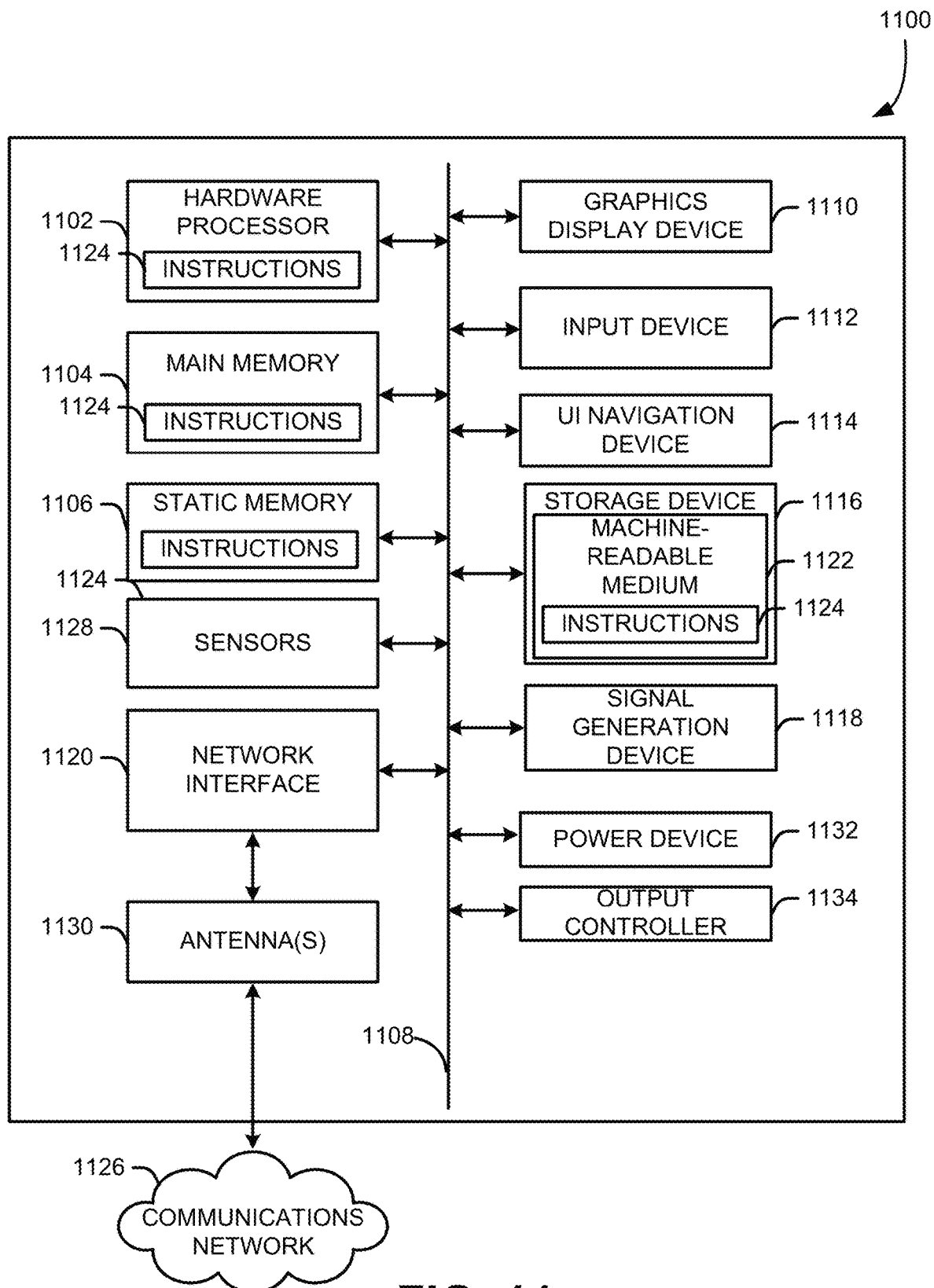
FIG. 11 illustrates a block diagram of an example machine upon which any of one or more techniques (e.g., methods) may be performed, in accordance with one or more example embodiments of the present disclosure.

FIG. 11 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. The machine 1100 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include any combination of the illustrated components. For example, the machine 1100 may include a hardware processor 1102 (e.g., a central processing unit (CPU), a graphics processing unit (GPU), a tensor processing unit (TPU) including an artificial intelligence application-specific integrated circuit (ASIC), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a signal generation device 1118 (e.g., a data signal), a network interface device/transceiver 1120 coupled to antenna(s) 1130, and one or more sensors 1128, such as a sound detecting sensor (e.g., a microphone), accelerometers, magnetometers, location sensors, and the like. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   creating a trunk blockchain ledger, comprising:
   a first unique identifier usable to access the trunk blockchain ledger;
   one or more signature rules; and one or more public keys;
creating, a first branch blockchain ledger off of the trunk blockchain ledger, the first branch blockchain ledger comprising:
the first unique identifier; and
a second unique identifier usable to access the first branch blockchain ledger;
recording, on the first branch blockchain ledger, at least a first blockchain transaction, wherein the first blockchain transaction comprises a first claim that is digitally signed using a private key corresponding to a public key of the one or more public keys;
providing the first claim to a trusted entity;
receiving, from the trusted entity, a first endorsement pointer that references the first claim, wherein the first endorsement pointer comprises:
a first hash of the first claim; and
a reference to a first endorsement that is located on a second blockchain ledger that is controlled by the trusted entity;
recording, on the first branch blockchain ledger, the first endorsement pointer;
receiving a link to the first branch blockchain ledger, wherein the link comprises the second unique identifier;
obtaining the first claim from the first branch blockchain ledger;
determining whether the first claim has a corresponding endorsement;
determining, based on presence of the first endorsement pointer on the first branch blockchain ledger, that the first claim is endorsed;
identifying, based on the first endorsement pointer, a second blockchain ledger;
obtaining, from the first endorsement located on the second blockchain ledger, a second hash;
determining whether the first hash matches the second hash; and
contingent upon the first hash matching the second hash, indicating that the first claim has a valid endorsement.

2. The computer-implemented method of claim 1, further comprising:
determining, for the second blockchain ledger, a corresponding second trunk blockchain ledger;
determining a second public key; and
using the second public key to verify that the first endorsement was generated by the trusted entity.

3. The computer-implemented method of claim 1, further comprising:
creating, a third branch blockchain ledger, comprising:
the first unique identifier; and
a third unique identifier usable to access the third branch blockchain ledger;
recording a second transaction comprising a second claim to the third branch blockchain ledger; and
wherein the first claim is not recorded to the third branch blockchain ledger.

4. The computer-implemented method of claim 1, further comprising:
receiving, from a second trusted entity, a second endorsement pointer that references the first claim, wherein the second endorsement pointer comprises:
the first hash of the first claim; and
a second reference to a second endorsement that is located on a fourth branch blockchain ledger that is controlled by the second trusted entity; and
recording, on the first branch blockchain ledger, the second endorsement pointer.

5. The computer-implemented method of claim 1, wherein the second blockchain ledger comprises a plurality of hashes corresponding to different endorsements.

6. The computer-implemented method of claim 1, wherein the first claim is encoded in a plaintext format.

7. A system, comprising:
one or more processors; and
memory storing executable instructions that, as a result of execution by the one or more processors, cause the system to:
create a trunk blockchain ledger, comprising:
a first unique identifier usable to access the trunk blockchain ledger;
one or more signature rules; and
one or more public keys;
create, a first branch blockchain ledger, comprising:
the first unique identifier; and
a second unique identifier usable to access the first branch blockchain ledger;
record, on the first branch blockchain ledger, at least a first blockchain transaction, wherein the first blockchain transaction comprises a first claim that is digitally signed using a private key corresponding to a public key of the one or more public keys;
provide the first claim to a trusted entity;
receive, from the trusted entity, a first endorsement pointer that references the first claim, wherein the first endorsement pointer comprises:
a first hash of the first claim; and
a reference to a first endorsement that is located on a second blockchain ledger that is controlled by the trusted entity; and
record, on the first branch blockchain ledger, the first endorsement pointer;
create, a third branch blockchain ledger, comprising:
the first unique identifier; and
a third unique identifier usable to access the third branch blockchain ledger;
record a second transaction comprising a second claim to the third branch blockchain ledger; and
wherein the first claim is not recorded to the third branch blockchain ledger.

8. The system of claim 7, wherein the executable instructions include further instructions that, as a result of execution by the one or more processors, further cause the system to:
receive a link to the first branch blockchain ledger, wherein the link comprises the second unique identifier;
obtain the first claim from the first branch blockchain ledger;
determine whether the first claim has a corresponding endorsement;
determine, based on presence of the first endorsement pointer on the first branch blockchain ledger, that the first claim is endorsed;
identify, based on the first endorsement pointer, the second blockchain ledger;
obtain, from the first endorsement located on the second blockchain ledger, a second hash;
determine whether the first hash matches the second hash; and
contingent upon the first hash matching the second hash, indicating that the first claim has a valid endorsement.

9. The system of claim 8, wherein the executable instructions include further instructions that, as a result of execution by the one or more processors, further cause the system to:
determine, for the second blockchain ledger, a corresponding second trunk blockchain ledger;
determine a second public key; and
use the second public key to verify that the first endorsement was generated by the trusted entity.

10. The system of claim 7, wherein the executable instructions include further instructions that, as a result of execution by the one or more processors, further cause the system to:
receive, from a second trusted entity, a second endorsement pointer that references the first claim, wherein the second endorsement pointer comprises:
the first hash of the first claim; and
a second reference to a second endorsement that is located on a fourth branch blockchain ledger that is controlled by the second trusted entity; and
record, on the first branch blockchain ledger, the second endorsement pointer.

11. The system of claim 7, wherein the second blockchain ledger comprises a plurality of hashes corresponding to different endorsements.

12. The system of claim 7, wherein the first claim is encoded in a plaintext format.

13. A non-transitory computer-readable storage medium storing executable instructions that, as a result of being executed by one or more processors of a computer system, cause the computer system to at least:
create a trunk blockchain ledger, comprising:
a first unique identifier usable to access the trunk blockchain ledger;
one or more signature rules; and
one or more public keys;
create, a first branch blockchain ledger, comprising:
the first unique identifier; and
a second unique identifier usable to access the first branch blockchain ledger;
record, on the first branch blockchain ledger, at least a first blockchain transaction, wherein the first blockchain transaction comprises a first claim that is digitally signed using a private key corresponding to a public key of the one or more public keys;
provide the first claim to a trusted entity;
receive, from the trusted entity, a first endorsement pointer that references the first claim, wherein the first endorsement pointer comprises:
a first hash of the first claim; and
a reference to a first endorsement that is located on a second blockchain ledger that is controlled by the trusted entity;
record, on the first branch blockchain ledger, the first endorsement pointer;
receive, from a second trusted entity, a second endorsement pointer that references the first claim, wherein the second endorsement pointer comprises:
the first hash of the first claim; and
a second reference to a second endorsement that is located on a fourth branch blockchain ledger that is controlled by the second trusted entity; and
record, on the first branch blockchain ledger, the second endorsement pointer.

14. The non-transitory computer-readable storage medium of claim 13, wherein the executable instructions include further instructions that, as a result of execution by the one or more processors, further cause the computer system to:
receive a link to the first branch blockchain ledger, wherein the link comprises the second unique identifier;
obtain the first claim from the first branch blockchain ledger;
determine whether the first claim has a corresponding endorsement;
determine, based on presence of the first endorsement pointer on the first branch blockchain ledger, that the first claim is endorsed;
identify, based on the first endorsement pointer, the second blockchain ledger;
obtain, from the first endorsement located on the second blockchain ledger, a second hash;
determine whether the first hash matches the second hash; and
contingent upon the first hash matching the second hash, indicating that the first claim has a valid endorsement.

15. The non-transitory computer-readable storage medium of claim 14, wherein the executable instructions include further instructions that, as a result of execution by the one or more processors, further cause the computer system to:
determine, for the second blockchain ledger, a corresponding second trunk blockchain ledger;
determine a second public key; and
use the second public key to verify that the first endorsement was generated by the trusted entity.

16. The non-transitory computer-readable storage medium of claim 13, wherein the executable instructions include further instructions that, as a result of execution by the one or more processors, further cause the computer system to:
create, a third branch blockchain ledger, comprising:
the first unique identifier; and
a third unique identifier usable to access the third branch blockchain ledger;
record a second transaction comprising a second claim to the third branch blockchain ledger; and
wherein the first claim is not recorded to the third branch blockchain ledger.

17. The non-transitory computer-readable storage medium of claim 13, wherein the first claim is encoded in a plaintext format.

* * * * *